R. I. McKISSACK.
LIQUID FUEL GAS GENERATOR.
APPLICATION FILED JAN. 2, 1914.
1,113,029.
Patented Oct. 6, 1914.
2 SHEETS—SHEET 2.
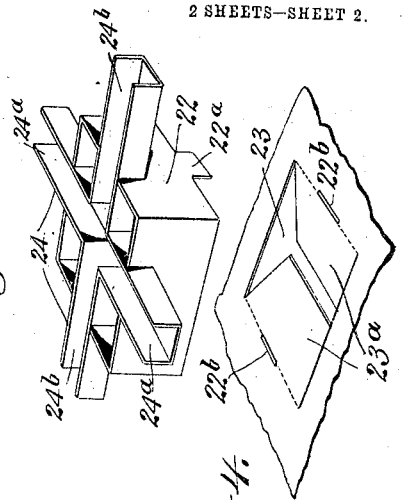
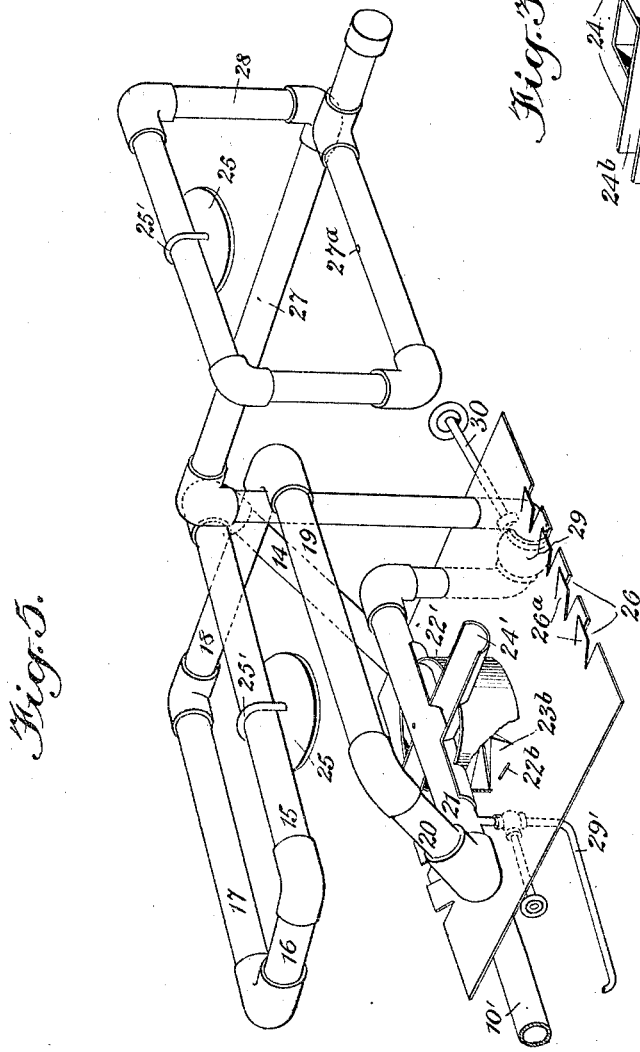
WITNESSES
Geo. W. Naylor
Geo. L. Beeler
INVENTOR
Robert I. McKissack
BY Munn & Co.
ATTORNEYS

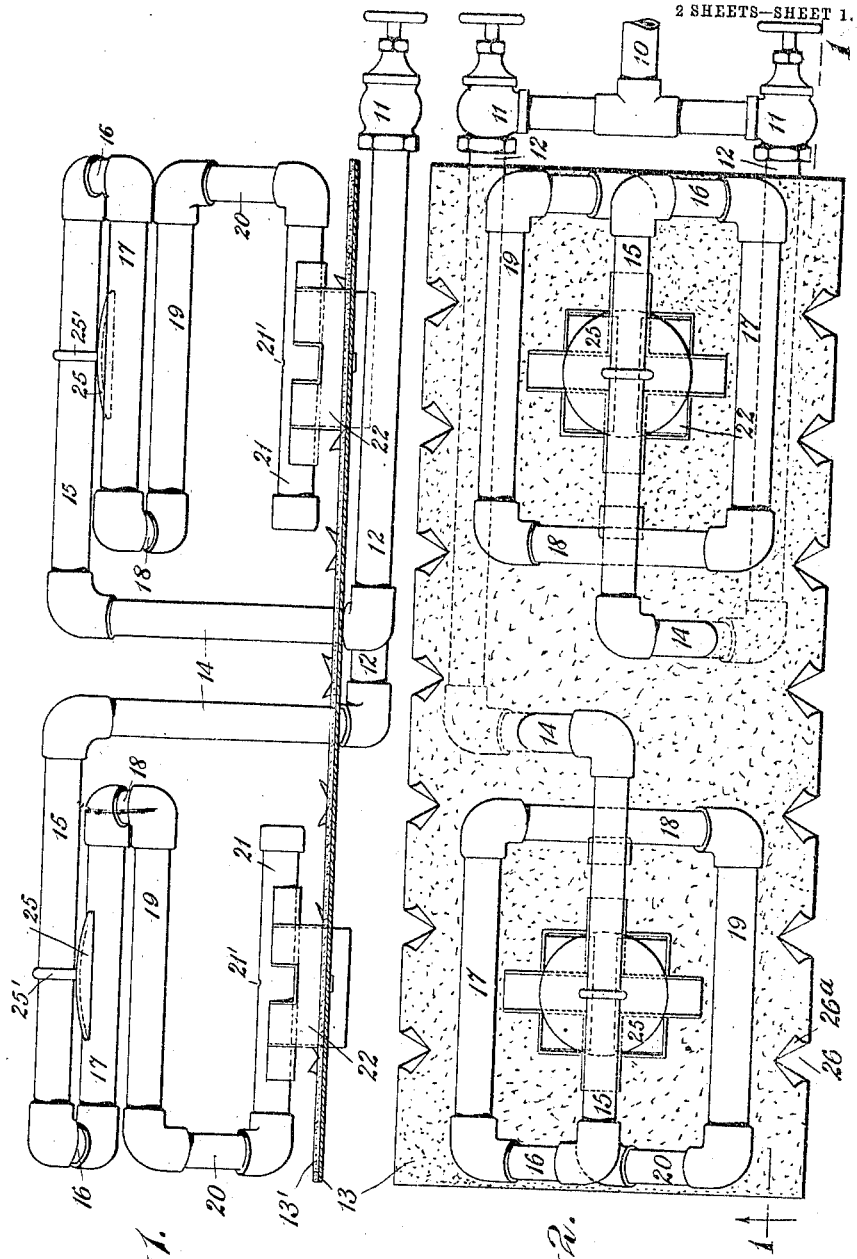

UNITED STATES PATENT OFFICE.

ROBERT I. McKISSACK, OF NEW ORLEANS, LOUISIANA.

LIQUID-FUEL-GAS GENERATOR.

1,113,029.  Specification of Letters Patent.  Patented Oct. 6, 1914.

Application filed January 2, 1914. Serial No. 810,094.

*To all whom it may concern:*

Be it known that I, ROBERT I. MCKISSACK, a citizen of the United States, and a resident of New Orleans, in the parish of Orleans and State of Louisiana, have invented a new and Improved Liquid-Fuel-Gas Generator, of which the following is a full, clear, and exact description.

My invention relates to a generator for the production of heat for domestic and general use.

One of the principal objects of this invention is to provide a reliable, economical and efficient means for converting liquid fuel into gas combined with adjustable means for mixing the right amount of air with the gas to insure perfect combustion.

A further object of the invention is to provide in the construction and arrangement of the mechanical parts a trough system of cruciform structure for distributing the liquid fuel under the different parts of the generator whereby a more satisfactory initial priming or heating of the generating pipes is obtained for the purpose of starting the process of generating gas from the liquid fuel.

Another important object is to provide an auxiliary burner so disposed and associated with the generator, that the gas from said generator, when in operation, may be turned on through a specially arranged controlling valve and conveyed through a connecting pipe to the auxiliary burner by which it is re-superheated just before it is delivered from the jet port, thus assuring a thorough generation and a clean flame at the immediate point of applied heat and effectually avoiding the possible use of gas that may have partially re-condensed while passing through the connecting pipe between the generator and the auxiliary burner.

With the foregoing and other objects in view the invention consists of the construction, mechanism and novel combination of parts hereinafter more fully described, illustrated in the accompanying drawings, and pointed out in the claims hereto appended, it being understood that various changes in form, structure, proportion, size and minor details, within the scope of my claims, may be resorted to without departing from the spirit of or sacrificing any of the advantages of the invention.

Figure 1 is a side elevation of the principal parts of my invention, the base pan being in longitudinal section; Fig. 2 is a plan view of the same; Fig. 3 is a perspective view of one of the air shafts and pipe supports; Fig. 4 is a detail perspective view of a portion of the pan showing the adjustable air openings; and Fig. 5 is a perspective view of a slight modification of the same invention.

In carrying out the objects of my invention a fuel supply pipe is provided connecting the generator with any suitable source of liquid fuel supply (not shown), and the flow of fuel is controlled with any suitable valve. The fuel tank may be of any suitable size or shape and placed in any convenient location, either near to or some distance away from the generator and operated either by gravity flow or air pressure.

Liquid fuel of any suitable character, such as kerosene, distillate, etc., is conveyed to the burner through a pipe 10 and thence past a control valve 11 into and through a horizontal pipe 12 which may lie comparatively close to and under the base pan 13. From the pipe 12 the fuel is carried upwardly by means of a pipe 14 and thence through a horizontal elevated vaporizer pipe 15 from the end of which it passes through a short inclined pipe 16 and thence through a series of superheating or retort pipes 17, 18 and 19 constituting the three sides of a rectangle. Thence the fuel passes downwardly through a short pipe 20 into the nozzle pipe 21 which lies in a horizontal position and substantially central with respect to the retort pipes above described. The nozzle pipe 21 lies in or is supported by a vertical casing or air-shaft 22, shown in Figs. 1, 2 and 3 as rectangular in outline and having an open bottom communicating with a rectangular air opening 23 formed in or through the base pan 13. Said vertical air-shaft structure 22 is arranged to support a double trough or cruciform distributer 24 having four arms leading outwardly from the center. Two of said arms 24ª support the nozzle pipe 21 and the other two 24ᵇ, preferably at right angles to the first, are open at their tops and ends. The nozzle pipe 21 is provided preferably with a single jet hole 21′ which is directed upwardly from the axis of the air-shaft and is adapted to deliver the liquid so that it will spread over the nozzle pipe 21 when cold and be conveyed along all four of the arms of the distributer 24. Said fuel, therefore, will fill the arms of said distributer, and will also flow from the ends thereof and saturate any suitable filling, such as fibrous asbestos 13' or the like, lying around the air-shaft and within the pan 13 and below all of the chief pipe elements of the device. While the air-shaft is shown in the first figures as being rectangular, it will be obvious that it may be circular as shown in Fig. 5, and the cross section of the distributing troughs also may be curved as well as rectangular. I would have it understood also, in this connection, that while I describe the retort or superheating system as being rectangular, being made up largely of the pipes 17, 18 and 19, any other form that is found suitable may be used, without departing from the real invention covered by the claims.

It will be observed that all of the vaporizing, generating and superheating pipe elements leading beyond the valve 11 lie above the base pan and hence are subjected to the heat derived from the burning fuel delivered originally into the pan from the distributing troughs.

At 25 I show a deflector, preferably concaved, secured centrally of the system of pipes to the pipe 15.

To start generating, the fuel is turned on and a small amount is permitted to escape through the jet hole 21' to be distributed by the system of cruciform troughs all around under the pipes in the base pan, then ignited and all of the pipes of the generator are thus heated initially. Then the fuel is turned on again and the flow is regulated. The fuel in passing through the top pipe 15 is vaporized, the vapor in passing around through the superheating retort pipes 17, 18 and 19 is reduced to a clean gas which escapes through the jet hole in the capped nozzle pipe under the pressure caused by the expansion of the heated fuel, and shoots up with some force against the adjustable concaved flame spreader and deflector 25 suspended from the overlying vaporizing pipe. The vaporizing pipe is thus kept hot and the heat is deflected back against the surrounding superheating pipes, thus making the gas generating continuous until the valve controlling the admission of fuel is shut off.

The base pan is provided with adjustable air supply controlling devices and the entire construction is so combined and arranged that the mixture of air with the gas can be regulated so as to insure a perfect combustion.

Under each generator and supporting the same is an air shaft either round or square provided with notches in which are mounted quadrangular troughs with open ends for distributing the igniting fuel in the base pan and around under the vaporizing pipes and superheating retorts.

Each spreader or deflector 25 is attached to the vaporizing pipe 15 by means of a clamp 25' whereby the deflector may be tilted forwardly or rearwardly for the purpose of changing the direction in which the flame may be directed therefrom in accordance with varying requirements. For instance, when the deflector is adjacent to an oven, if it be so deflected, the flame may be directed so as to engage the oven more than the other parts to be heated.

The air opening 23, which leads to the air-shaft 22, is adjustable as to size preferably by means of a plurality of wings $23^a$ which, being constructed preferably of sheet metal, are adapted to be bent toward or from the center of the passage according to the requirements of any particular user or according to the variable conditions to be met in general use, having reference to the varying drafts of different stoves, furnaces, flues, etc. The air-shaft may be secured in place by means of lips or lugs $22^a$ adapted to pass through and clench beyond corresponding holes $22^b$ in the base pan. I also provide any desired number of small openings 26 along the sides of the base pan, the size of which is adjustable also as by means of adjustable flanges $26^a$. These openings 26 may be used in connection with those indicated leading directly through the center of the air-shaft.

Figs. 1 and 2 show a plurality of generators leading from the same supply pipe 10, each of said generators being controlled by its own independent valve 11. The description of one generator construction given above is applicable to any number of such generators. In Fig. 5 I show a single generator arrangement, the fuel to which is delivered by means of a pipe 10'. The air-shaft 22', as above stated, is circular or cylindrical, and the distributing troughs 24' are curved in cross section. The adjustable members $23^b$ for controlling the amount of air admitted upwardly through the air-shaft may in this form be segmental and of any suitable number.

As shown in Fig. 5, an extension 27 may be formed leading from the nozzle pipe 21 and connecting with an upwardly extending pipe which is further extended into a peculiar loop construction forming an auxiliary burner 28 through which the gas is forced from said pipe 27 and re-superheated before it is delivered from the jet port $27^a$. The elevated horizontal section of this auxiliary burner 28 supports a deflector 25 against which the flame from said jet port $27^a$ impinges. The nozzle pipe of the auxiliary burner may be further extended to provide additional auxiliary burners if desired, and the gas may be cut off from the auxiliary burners by means of any suitable type of valve 29 having a stem 30 of any required length. When used, for instance, in a cooking stove, with the base pan 13 lying in or near the bottom of the fire box of such stove, the generator, as above described, may constitute the burner for the front holes of the stove, and the extension 27 may lead back over the top of the oven and provide a suitable auxiliary burner for the rear holes. At 29' I show a small pipe or hollow wire tapping the nozzle pipe 21 and leading downwardly through the bottom of the base pan and thence in any direction whereby a portion of the generated gas may be utilized for use as a light or for other purposes.

Having thus described my invention, I claim as new and desire to secure by Letters Patent:—

1. In a device of the character set forth, the combination of a base pan having an air opening therethrough, an air shaft surrounding said opening and secured in upright position to said base pan, means to vary the area of said opening to regulate the quantity of air therethrough, the walls of said air-shaft having notches along the upper edge, a fuel distributer comprising a plurality of horizontal troughs supported in said notches and having open ends extending beyond the air-shaft, a nozzle pipe lying in certain of said troughs above the air-shaft and adapted initially to deliver liquid fuel along said troughs, and means serving to convey fuel to said nozzle pipe.

2. In a device of the character set forth, the combination of a base pan having a plurality of air openings therethrough, adjustable means to vary the area of said openings, an air-shaft secured to said pan and extending upwardly therefrom around one of said air openings, a fuel distributer supported upon said air-shaft and having a plurality of open-topped and open-ended troughs serving to convey liquid fuel initially outwardly beyond said air-shaft for delivery upon the pan between the adjustable openings, a nozzle pipe supported in a horizontal position upon one trough of said distributer, and pipes serving to convey fuel to said nozzle pipe and along planes at higher levels than said nozzle pipe, substantially as set forth.

3. In a liquid fuel gas generator of the kind described, the combination of a base pan provided with adjustable air controlling means, comprising leaf members integral with the base pan, a generator above the pan including a primary vaporizing pipe and associated superheating pipes, means to deliver liquid fuel into said generator, said generator also including a nozzle pipe having a jet opening directed upwardly and so disposed as to properly coöperate with the air admitted through said controlling means, a deflector or flame spreader adjustably connected to the primary vaporizer pipe and against which the flame from the jet impinges, and means to support the generator above said pan.

4. In a liquid fuel gas generator of the kind described, the combination of a base pan provided with adjustable air controlling means, a generator above the pan, said generator including a primary vaporizing pipe and a superheating system of pipes, means to deliver liquid fuel into said generator pipes, said generator including also a nozzle pipe having an upwardly directed jet adapted to deliver generated gas, at a point where it is properly mixed with the air admitted through said controlling means for heating the generator pipes, an extension gas conducting pipe connected to and leading from said nozzle pipe and an auxiliary burner provided with means for re-superheating the gas from the generator at a point of applied heat removed from the generator, and which may be utilized for various purposes and at varying distances from the generator.

5. In a liquid fuel gas generator of the kind described, the combination of a base pan provided with adjustable air-controlling means, a generator above the pan, said generator including a primary vaporizing pipe and a superheating system of pipes, means to deliver liquid fuel into said generator pipes, said generator including also a nozzle pipe having an upwardly directed jet adapted to deliver generated gas at a point where it is properly mixed with the air admitted through said controlling means, for heating the generator pipes, and means for re-superheating the gas at a point removed from the generator.

In testimony whereof I have signed my name to this specification in the presence of two subscribing witnesses.

ROBERT I. McKISSACK.

Witnesses:
 GEO. L. BEELER,
 PHILIP D. ROLLHAUS.